United States Patent
Dong et al.

(10) Patent No.: US 7,809,748 B2
(45) Date of Patent: Oct. 5, 2010

(54) EXTENDED CELL INFORMATION IN MULTIDIMENSIONAL DATA MODELS

(75) Inventors: George Randall Dong, Issaquah, WA (US); Jeffrey A. Wang, Seattle, WA (US); Patricia O'Connor Sebelsky, Camano Island, WA (US); Zhenyu Tang, Sammamish, WA (US); Sridharan V. Ramanathan, Kirkland, WA (US); Peter Eberhardy, Seattle, WA (US); Hai Huang, Redmond, WA (US); Xiaohong Yang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/710,328

(22) Filed: Feb. 23, 2007

(65) Prior Publication Data

US 2008/0208880 A1      Aug. 28, 2008

(51) Int. Cl.
*G06F 17/30* (2006.01)
(52) U.S. Cl. .............................. 707/781; 707/999.003; 707/999.01; 712/1
(58) Field of Classification Search .................... 707/3, 707/10, 104.1; 712/1
See application file for complete search history.

(56) References Cited

U.S. PATENT DOCUMENTS

| | | | |
|---|---|---|---|
| 5,918,232 A * | 6/1999 | Pouschine et al. ........ 707/103 R |
| 6,279,014 B1 | 8/2001 | Schilit et al. |
| 6,317,750 B1 | 11/2001 | Tortolani et al. |
| 6,621,505 B1 | 9/2003 | Beauchamp et al. |
| 6,707,454 B1 | 3/2004 | Barg et al. |
| 6,907,428 B2 | 6/2005 | Fitzpatrick et al. |
| 6,999,970 B2 * | 2/2006 | Pasumansky et al. ....... 707/101 |
| 7,013,307 B2 | 3/2006 | Bays et al. |
| 2002/0113803 A1 | 8/2002 | Samra et al. |
| 2002/0184260 A1 | 12/2002 | Martin et al. |
| 2003/0009649 A1 | 1/2003 | Martin et al. |
| 2004/0237029 A1 | 11/2004 | Medicke et al. |
| 2006/0080432 A1 | 4/2006 | Spataro et al. |

OTHER PUBLICATIONS

Thierry D'hers et al., "Handling Annotation and comments in Analysis Services", dated Apr. 2005, pp. 1-9.*
"Architecture and Benefits of PowerOLAP", Date: 2003, http://www.paristech.com/ PowerOLAP_%20Architecture_&_Benefits.pdf.
Isakowitz, "Toward a Logical/ Physical Theory of Spreadsheet Modeling", Date: Jan. 1995, pp. 1-37, vol: 13,No: 1, http://portal.acm.org/citation.cfm?id=195708&coll=portal&dI=ACM.
Witkowski, et al., "Advanced SQL Modeling in RDBMS", Date: Mar. 2005, pp. 83-121, vol: 30, No: 1, http://delivery.acm.org/10.1145/1070000/1061321/p83-witkowski.pdf?kev1=1061321&kev2=9820356611&coll=ACM&dI=ACM&CFID=75919783&CFTOKEN=92791909.

* cited by examiner

*Primary Examiner*—Apu M Mofiz
*Assistant Examiner*—Monica M Pyo
(74) *Attorney, Agent, or Firm*—Hope Baldauff Hartman, LLC

(57) ABSTRACT

Sharable extended cell information is used by multidimensional data models to enable cell annotations and line item details. Annotations are notes stored with a cell in a multidimensional dataset. Line item details permit levels of numeric detail below the lowest dimensional granularity. When receiving a multidimensional dataset in response to a query, a client application receives indicator information at the cell level, indicating to the client application that extended cell information is retrievable.

15 Claims, 10 Drawing Sheets

EXTENDED CELL INFORMATION IN MULTIDIMENSIONAL DATA MODELS

BACKGROUND

Business intelligence (BI) processes have become an integral part of many modern organizations. Multidimensional data models and On Line Analytical Processing (OLAP) tools can be vital components of modern BI technologies. Such data models and tools may be used to store and analyze operational, financial, and other metrics of an organization indexed along a multitude of dimensions. An organization can utilize such BI technologies to quickly compare and analyze these metrics in the most relevant context. For example, a chart of financial accounts may represent a standard dimension for a multidimensional financial data model. Each account (e.g., gross revenue or labor cost) may have an associated value, but the value for a particular account may vary over a number of other dimensions, including time, geographic region, corporate division, product, or scenario, for example. Such multidimensional data models, and multidimensional datasets extracted therefrom, are sometimes represented as OLAP cubes, although a three-dimensional cube may be inadequate for representing a data model with 4, 5, 6, or more dimensions.

Conventional data stores may provide flexible data entry functionality by enabling the entry of extended information at the cell level, functionality not found in multidimensional data models. For example, a spreadsheet application may enable the entry of annotations at the cell level so that users can add notes about a piece of data stored in the cell. These notes, however, may not be easily shareable in an enterprise environment. The same spreadsheet must be moved or copied between and among users in order to share annotations. The more users sharing the spreadsheets, the more cumbersome the sharing of annotations can become, especially when considering the needs of an enterprise to limit the ability of certain users to read and/or write to a particular cell.

Other types of extended information may not be possible with existing data models. Additional levels of detail may be desired by, for example, a user of a multidimensional data model who desires a level of numeric detail below the most granular cell level. A stored cell value may be the lowest level at which a model owner wishes to aggregate information. However, the user of the multidimensional data model may wish to associate additional itemizations or line items with the stored value. Such line item details are not available to users of existing multidimensional data models.

It is with respect to these considerations and others that the disclosure made herein is provided.

SUMMARY

Technologies are described herein for utilizing extended cell information with multidimensional data models. Through aspects presented herein, a multidimensional dataset can include information about cell-level extended information, including cell annotations and line item details. Line item details associated with a cell each include numeric values that sum to the cell value.

According to one aspect presented herein, a method provides for a server receiving a request for a multidimensional dataset, producing the dataset, and incorporating extended cell information indicators into the multidimensional dataset. The extended cell information indicators can include counts of annotations associated with a cell, counts of line item details associated with the cell, or other information.

According to another aspect presented herein, a system includes a multidimensional data model and an extended cell information module. The extended cell information module processes the multidimensional data model and incorporates information identifying the existence of extended cell information into the resulting multidimensional dataset. Upon receipt of a subsequent request for the extended cell information, the extended cell information module retrieves the relevant extended cell information. Extended cell information can include annotations and line items associated with a cell value in the multidimensional dataset. Information identifying the existence of extended cell information can include one or more counts of annotations and/or line items associated with the cell.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
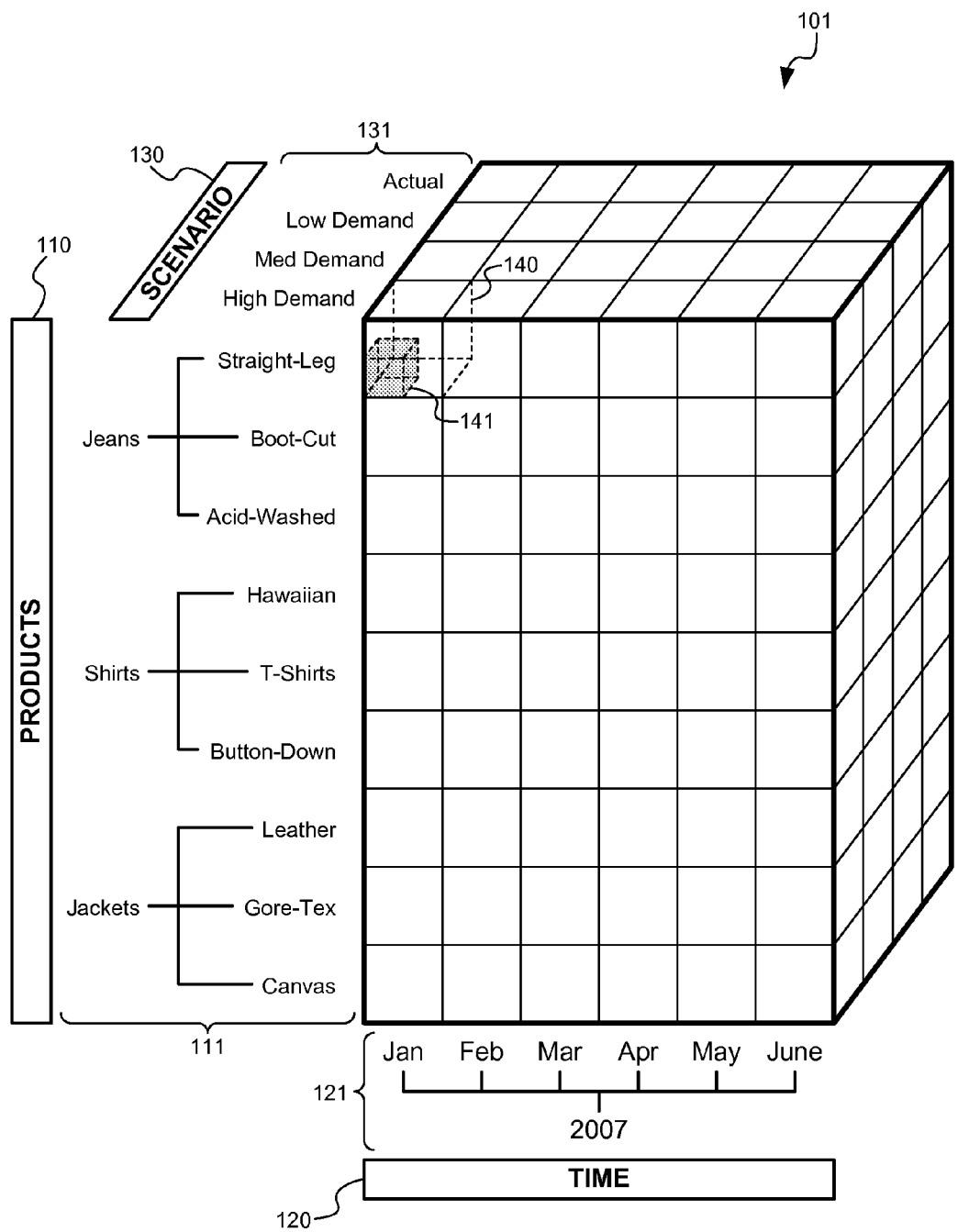
FIG. 1 is a depiction of a multidimensional dataset provided in one or more embodiments described herein.

The following detailed description is directed to technologies for utilizing extended cell information in multidimensional data models. As will be discussed in detail below, extended information, which includes annotations and line items, is associated with data stored in a multidimensional data model. The multidimensional data model includes data stored and indexed over multiple dimensions. By associating extended cell information such as annotations and line items with data, users can add more useful information to a shared multidimensional data model than was previously possible.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other configurations, including hand-held devices, embedded systems, multiprocessor and clustered systems, microprocessor-based or programmable consumer electronics, minicomputers, and mainframe computers, for example.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for associating multidimensional data models will be described.

In particular, FIG. 1 is a depiction of a multidimensional dataset 101 represented as a cube. The multidimensional dataset 101 may be a subset of the data stored in a particular multidimensional data model. Although shown as a three-dimensional object, the multidimensional dataset 101 may include more than three dimensions. As a result, a three-dimensional representation such as the cube may ignore or make assumptions about the dimensions not depicted. In the model of FIG. 1, the dimensions shown are product 110, time 120, and scenario 130. Each dimension includes a set of members, including a set of product members 111, a set of time members 121, and a set of scenario members 131. Dimension members can be hierarchical, as with the product members 111 and the time members 121.

At an intersection of three dimension members, textually described as [Product].[Jeans].[Straight-Leg], [Time].[2007].[Jan], [Scenario].[High Demand], the tuple or cell 140 may include one or more measure values 141. The measure value 141 may be, for example, the expected demand for straight-leg jeans in January of 2007. Other measure values at cell 140 may include, for example, incremental cost, expected revenue, and manufacturing capacity. Additional information stored with the cell 140 may include one or more numeric counts or flags indicating the availability of extended cell information, which is describe in more detail below. This additional information may be provided as additional and/or hidden measure values 141.

Figure 2:
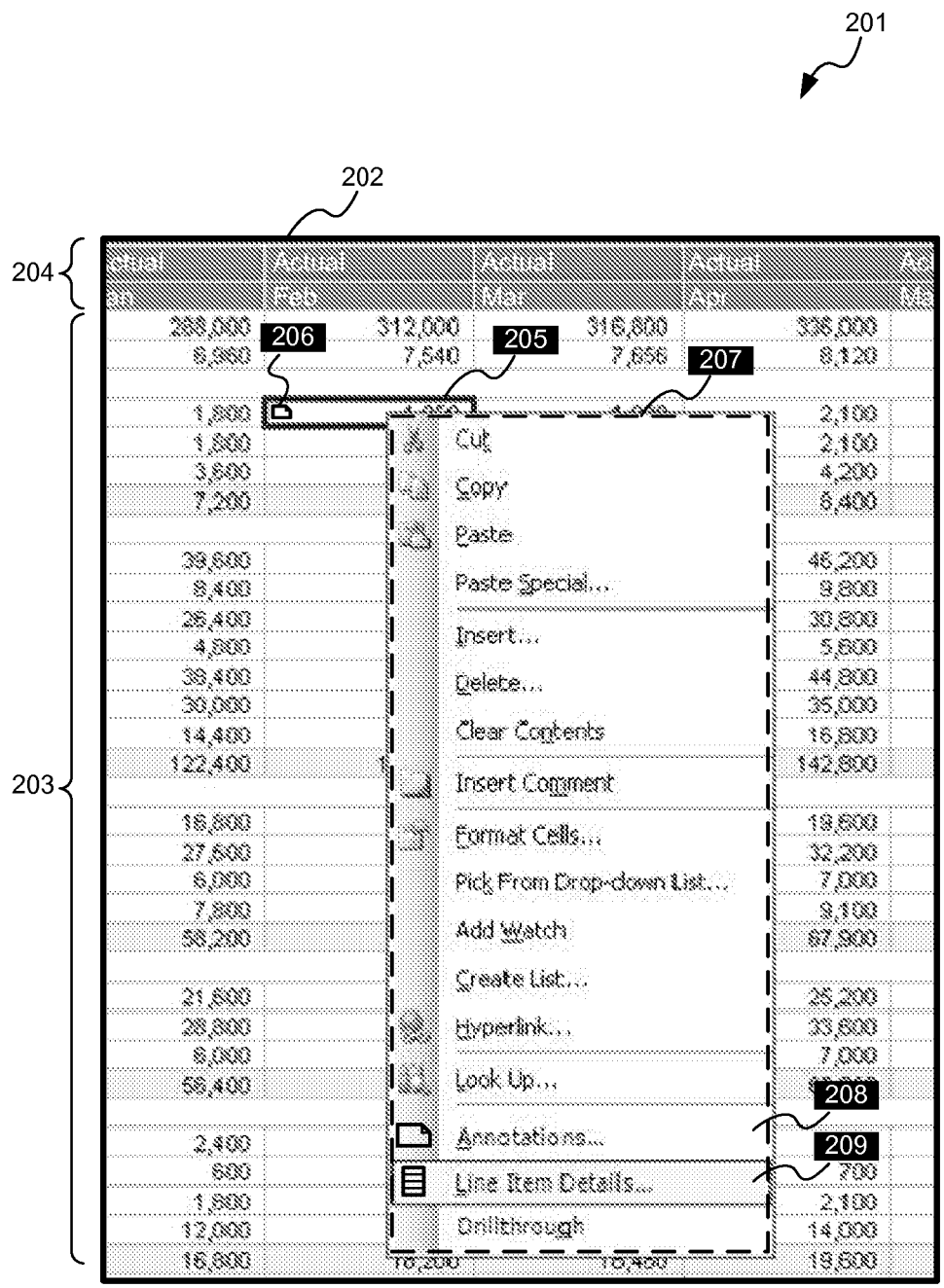
FIGS. 2 through 4 are user interface diagrams depicting three views of a client analysis application according to one or more embodiments described herein.
Figure 3:
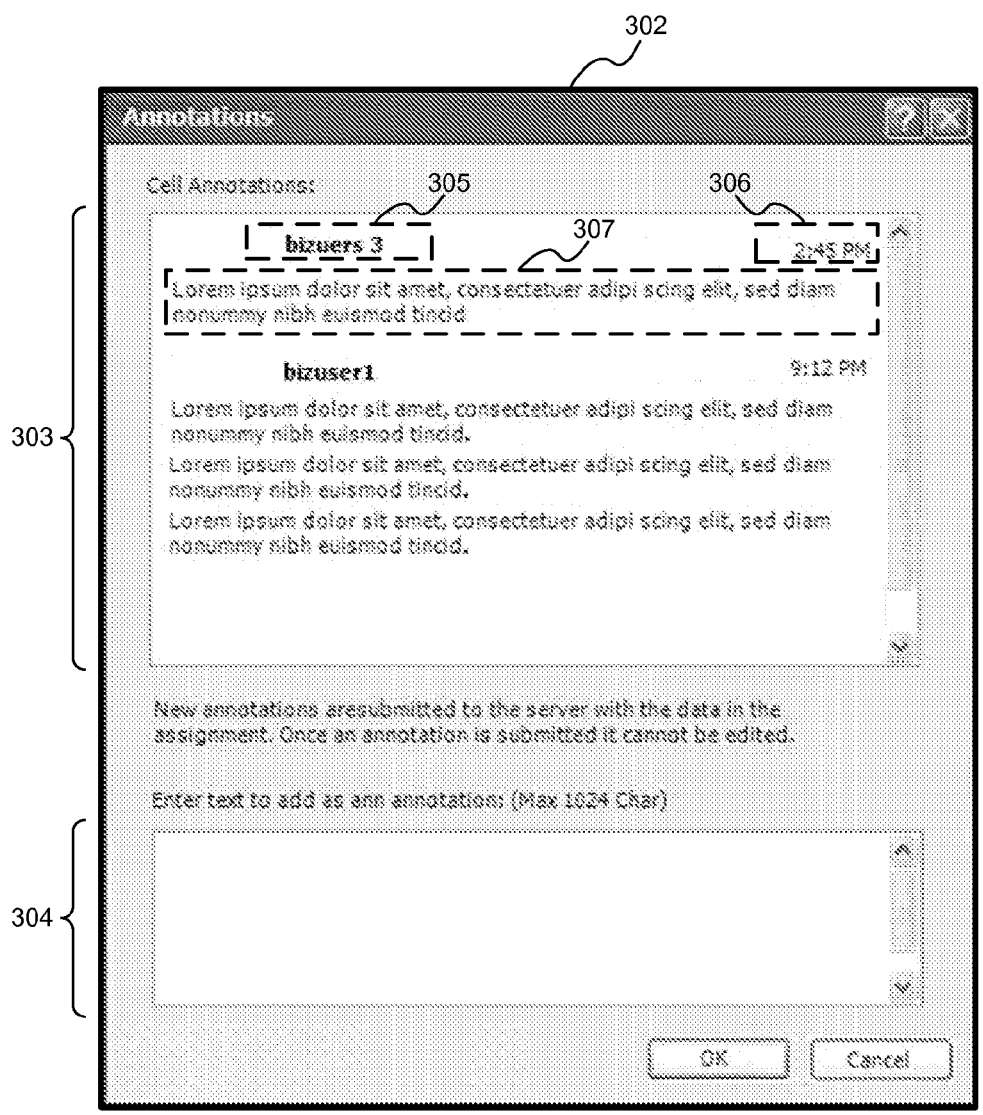
Figure 4:
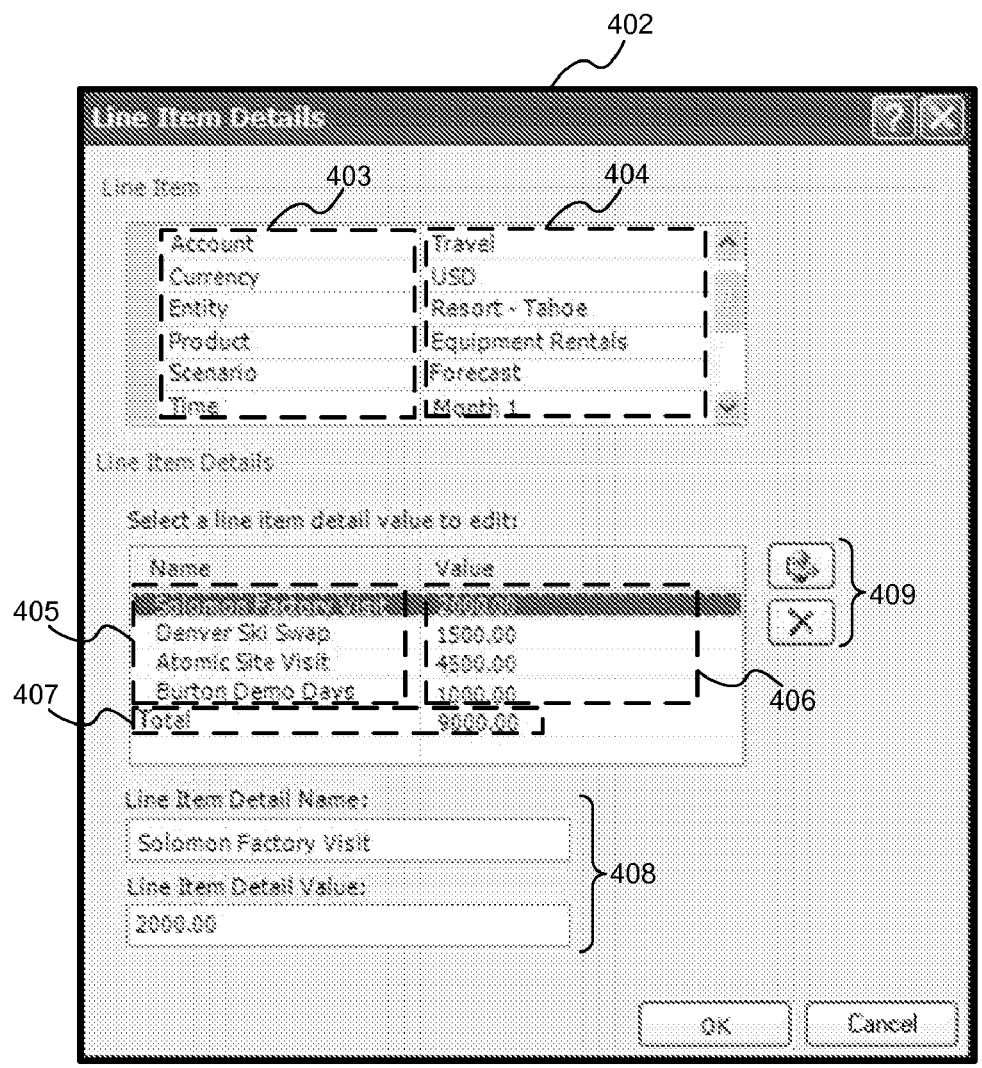

FIGS. 2-4 depict examples of user interfaces provided herein that may be used to read, update, and create extended cell information in a multidimensional dataset 101. The interfaces shown in FIGS. 2-4 are merely examples and may be implemented using a dedicated software application or a configurable interface such as an Internet web browser. Other interface implementations not shown may fall within the scope of the claims set forth below.

FIG. 2 is an example of a user interface 202 for a client application 201. The client application 201 is a software application running on a computer system, described generally below. The client application 201 may work with a multidimensional dataset 101 stored on the computer system or stored remotely on another computer system, such as a server. The client application 201 may be a spreadsheet application that includes client logic for understanding and editing extended cell information. Such logic may be included with the client application 201 as originally installed or supplied after installation via an update, a patch, a plug-in, or other installable component.

In the example of FIG. 2, the interface 202 includes a grid 203 of displayed cell values that are stored in the multidimensional dataset 101. The interface 202 also includes a depiction of dimensions 204, which coincide with the cell values in the grid 203. The client application 201 receives the multidimensional dataset 101 as a subset of the data stored in a multidimensional data model. In a displayed cell 205, the client application 201 may show a measure value 141 associated with a cell 140 based on the dimension members currently in context. The displayed cell 205 may include a visual indicator 206 such as an icon or a cell color, for example. The visual indicator may indicate the presence of extended cell information such as annotations and/or line items. An annotation is a note, or other information intended to supplement the value in the associated displayed cell 205. Multiple users can enter multiple annotations for the same displayed cell 205. A set of line item details also provide additional information about a displayed cell 205. Each line item describes a component value, the set of line item component values summing to equal the value in the displayed cell 205.

A user can select the displayed cell 205 and can trigger (e.g., by rights clicking) the display of a task menu 206. The client application 102 includes tasks on the task menu 206 that are relevant to the displayed cell 205, including an annotations task 208 and a line item details task 209. When the user selects either task, the user can view any previously created extended cell information associated with the cell 140 underlying the displayed cell 205. Examples of interfaces for displaying extended cell information are provided below. If, for any reason, extended cell information is unavailable (e.g., extended cell information is not configured for the underlying multidimensional data model), then the annotations task 208 and the line item details task 209 may be disabled and/or hidden. It should be noted that the task menu 206 is only one example of a method for displaying extended cell information. Other methods may include hot keys, menu selections, roll over hints, and any other method for displaying additional information about the displayed cell 205.

An annotations interface 302 is depicted in FIG. 3, which is an example of a user interface that may be displayed when a user selects the annotations task 208 in FIG. 2. The annotations interface 302 displays annotations associated with the cell 140 underlying the displayed cell 205. Any annotations are shown in the cell annotations panel 303. If the user wishes to add another annotation, and the user has the permissions required to do so, the user can enter a new annotation in an entry panel 304. If the user was permitted to read cell annotations, but not write them, then the entry panel 304 may be hidden or otherwise be disabled. Any newly created annotations are associated with the underlying cell 140 and sent for storage within the originating multidimensional data model.

In the example of FIG. 3, for each annotation in the cell annotations panel 303, an annotation body 307 is received and stored. In addition, other information about the annotation may be recorded, including the user 305 that entered the annotation, and a timestamp 306 (and/or date stamp) of when the annotation was entered. Additional information may be displayed on the annotations interface, including but not limited to, dimension members indicating the dimension member values of the underlying cell 140.

It should be noted that annotations can be associated at any dimension level in a hierarchical dimension. For example, if a value in a display cell 205 represented a rolled-up value (i.e., the yearly sum of a monthly value), an annotation can still be associated with the underlying cell 140.

FIG. 4 depicts a line item interface 402, as may be displayed when a user selects the line item details task 209 on the contextual menu 206. The line item interface 402 displays line item details associated with the underlying cell value 141. The line item interface includes line item keys, showing a dimension set 403 and accompanying dimension members 404, which together point to the underlying cell value 141 being detailed. Each line item detail includes detail name 405, and an associated detail value 406. A total value 407 is calculated based on the sum of the detail values 406 for the current line items. The total value 407 is the value actually stored in the cell value 141 and is used in any subsequent aggregations.

When the user clicks on one of the line item details, the user can update the detail name 405 and the detail value 406 using the editing region 408. The user can also use function buttons 409 to add and delete line item details for the underlying cell value 141. It should be noted that, unlike annotations, line items may only be associated with the lowest level in a hierarchical dimension. This is because the value of a higher dimension level relies on the values of other cells beneath it in the hierarchy and can not depend on free form line items.

Figure 5:
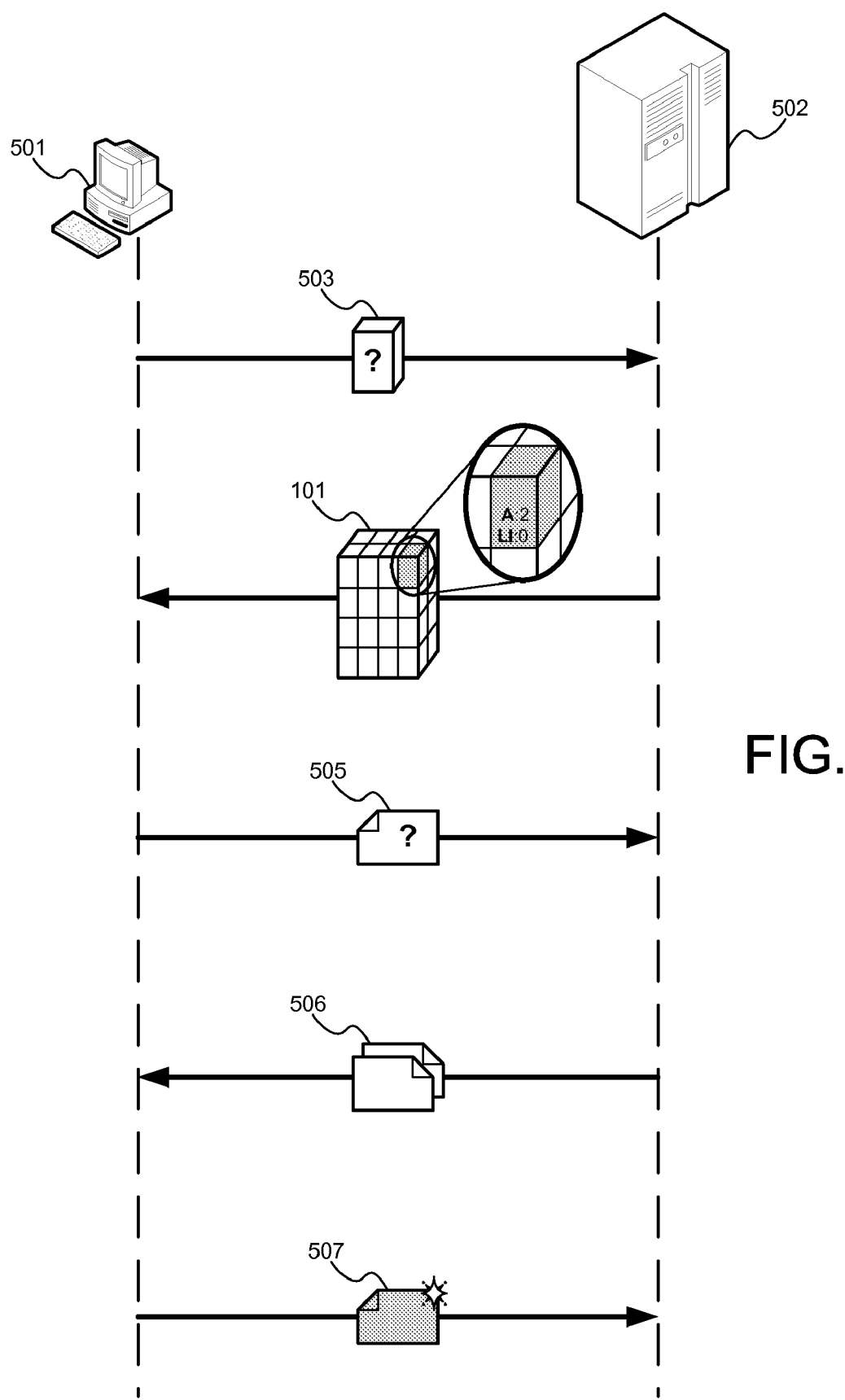
FIGS. 5 and 6 are interaction diagrams depicting client server communications according to one or more embodiments described herein.
Figure 6:
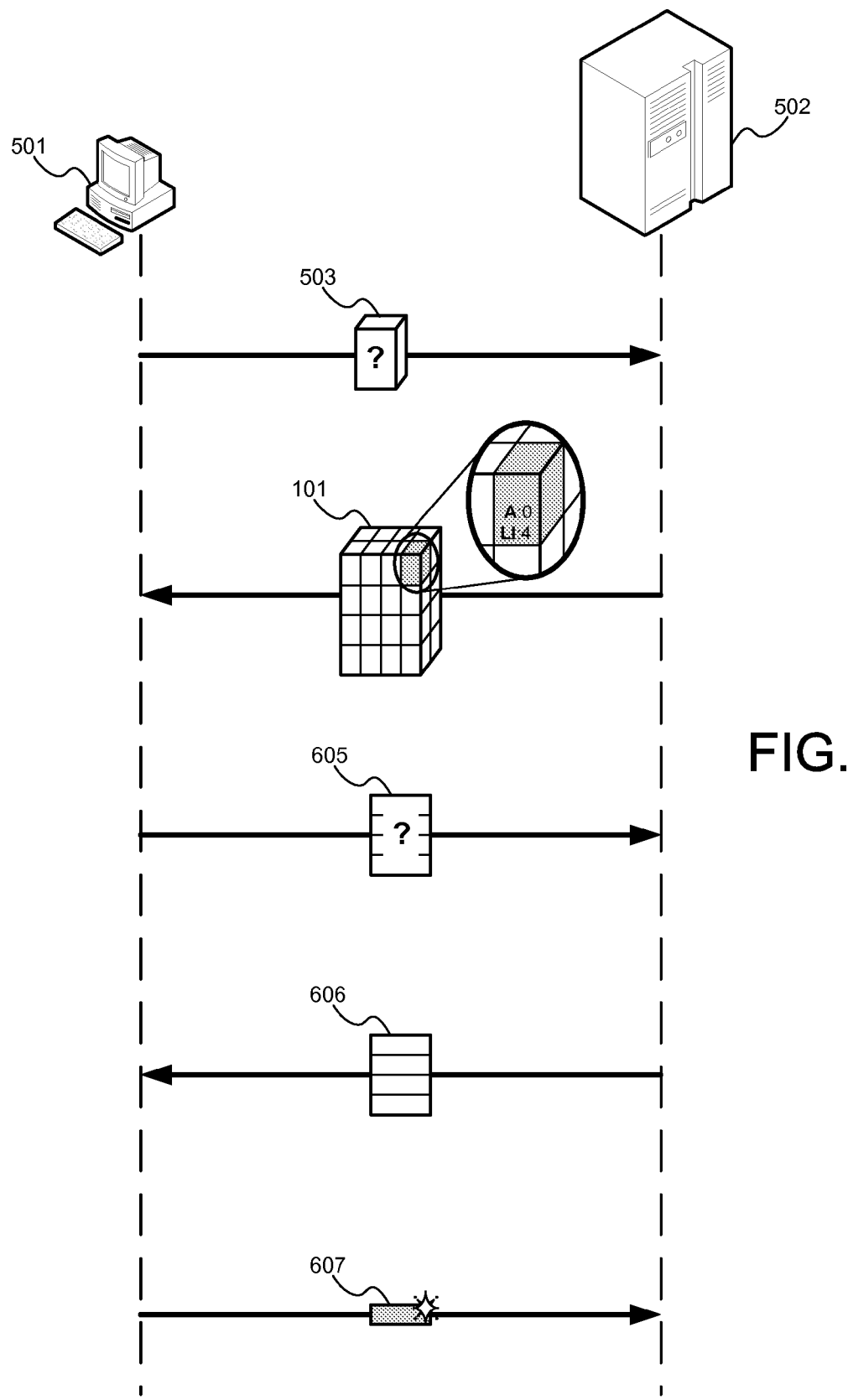

FIGS. 5 and 6 are interaction diagrams which give more information about and examples of the communications which can pass between a client application 201 operating on a client computer system 501 and a server application operating on a server computer system 502. Although depicted as two computer systems, the communications depicted may occur within the same computer system. The communications depicted are not intended to serve as the only communications needed to utilize extended cell information, but are merely provided as examples of the types of electronic information that can be used.

FIG. 5 in particular is an interaction diagram showing communications required for utilizing annotations in one implementation. After communication between the client computer system 501 and the server computer system 502 is established and information about the multidimensional data model has been shared, the client may query 503 the server for the multidimensional dataset 101. The server 502 may reply with the multidimensional dataset 101, including information about the existence of any extended cell information such as annotations and line items. In some instances, if the user is not permitted to view data in the multidimensional dataset 101, an error may be sent back. Otherwise, the multidimensional dataset 101 may include for each cell 140 and/or cell value 141 a count of annotations and/or line items. For the cell 140, the annotation count shows two available annotations.

At this point, the client application 201 on the client computer system 501 may utilize the count information to indicate to a user that a particular cell has annotations. The information may otherwise be ignored. It should be noted that the information regarding the extended cell information may be provided as an additional measure for the cells in the multidimensional dataset 101, and need not require an additional query to determine the presence of extended cell information. Additionally, if a client application 201 cannot handle extended cell information, this information stored with the multidimensional dataset 101 should be ignored.

If needed, the client 501 can communicate a request 505 to the server 502 for one or more annotations based on the supplied annotation count. For example, if the user selects on the interface 202 the displayed cell 205 having annotations, and then the user requests to view and/or edit the annotations using the annotations task 208, then the client 501 can form the request 505 to send the annotations from the server 502. Based on a set of parameters passed with the request 505 identifying one or more underlying cells 140, the annotations 506 are returned and can be displayed as in the example of the annotations interface 302. If the user decides to create a new annotation 507, the new annotation is sent back to the server where, if the user is allowed to create the new annotation, it is stored with the appropriate underlying cell 140.

The interactions of FIG. 6 for discovering and retrieving available line item details is similar to that depicted in FIG. 5. The client 501 forms a request 503 for a multidimensional dataset 101. The server 502, upon receiving the request 503 responds with the multidimensional dataset 101, this time including a line item count of four line items for a particular cell. The client 501, either automatically or reacting to a user request, forms a request 605 to retrieve the four line items for the cell, and the server 502 responding to the request provides the line items 606. The request 605 may be in the same format as the request 505 in FIG. 5, simply with different parameters set to indicate that line items should be retrieved. If the user decides to add a fifth line item to the collection, the new line item 607 is passed back to the server 502. This assumes that the user has the relevant permissions to create the line item.

Figure 7:
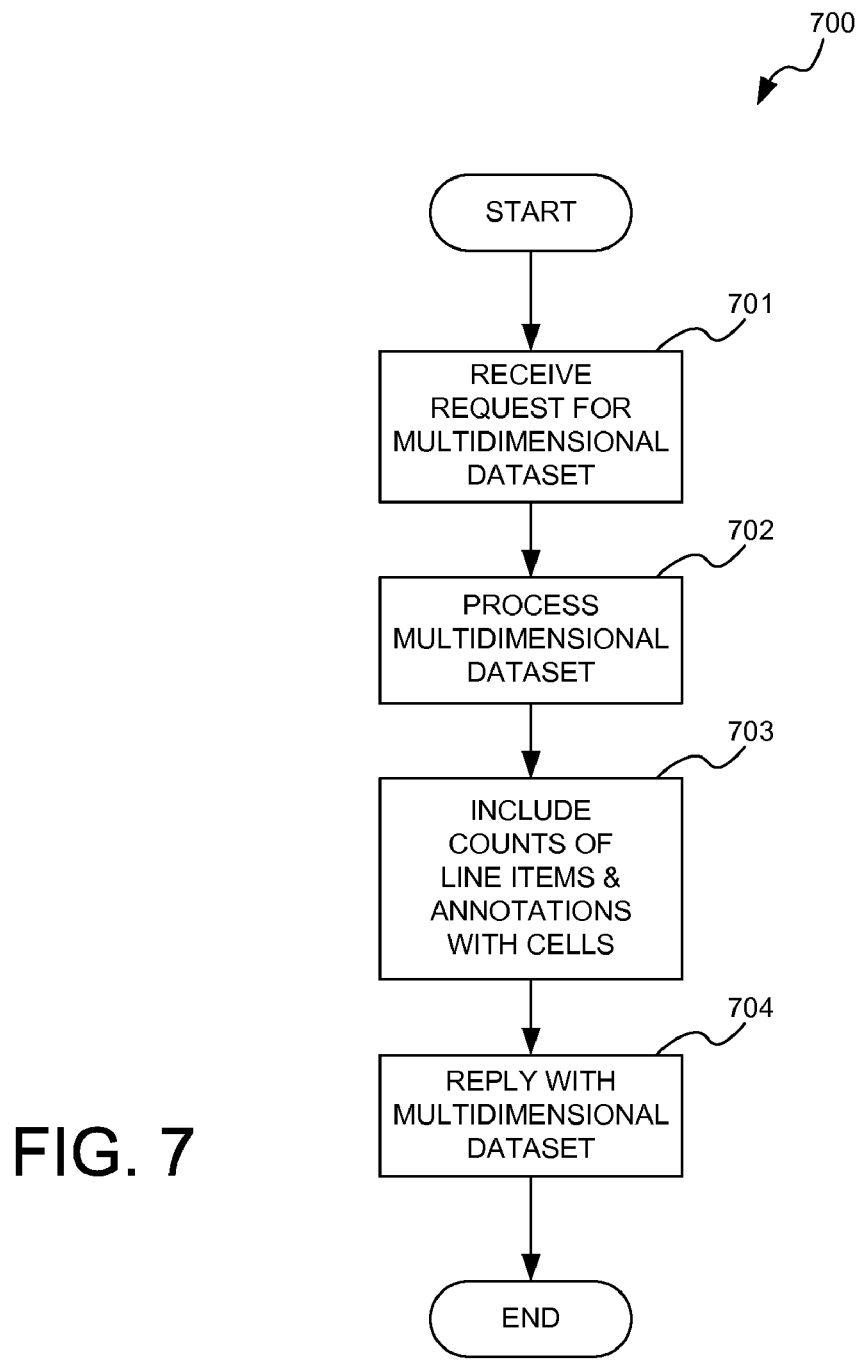
FIG. 7 is a flow diagram depicting a process for indicating availability of extended cell information according to one or more embodiments described herein.
Figure 8:
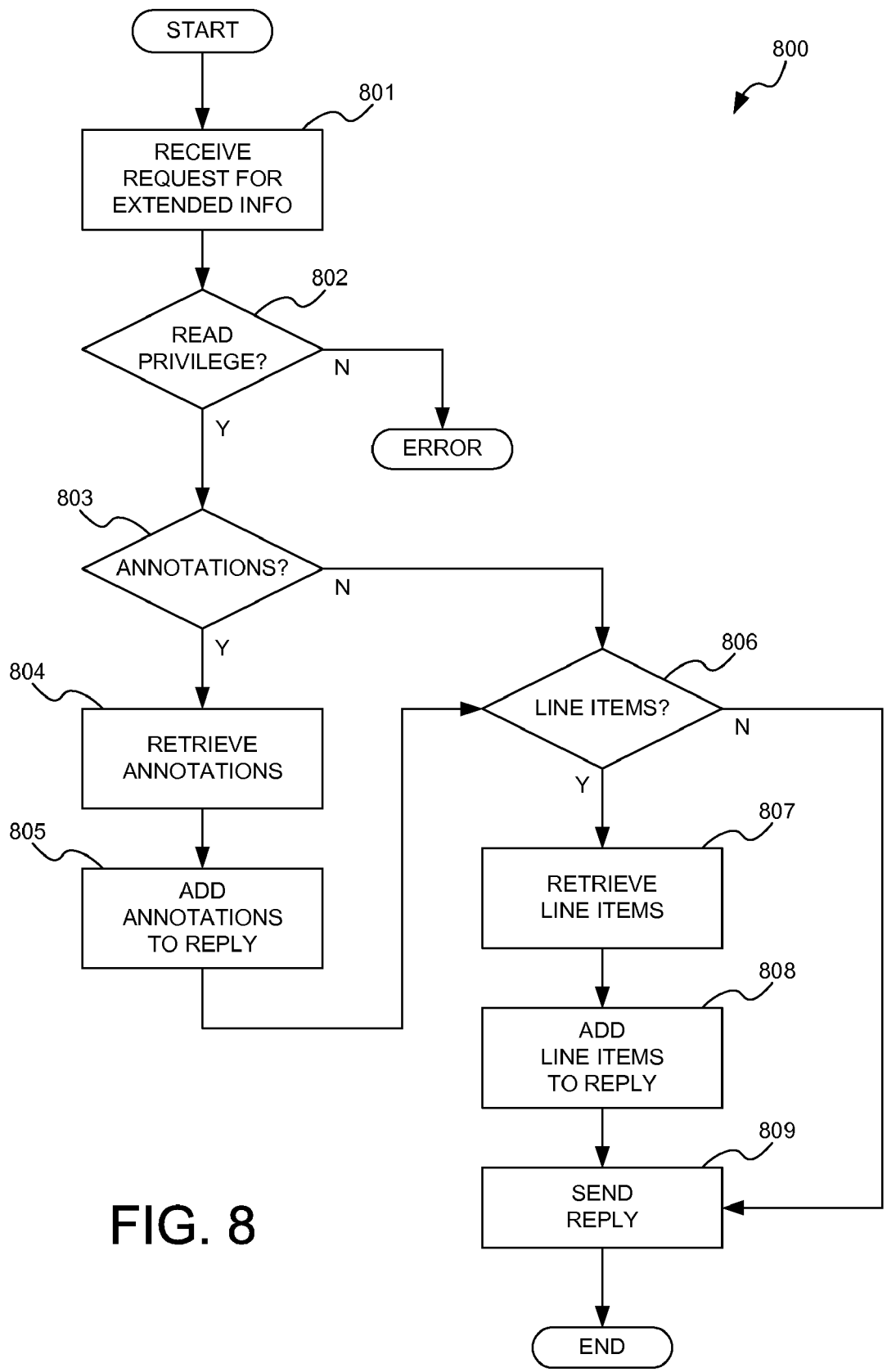
FIG. 8 is a flow diagram depicting a process for retrieving extended cell information according to one or more embodiments described herein.
Figure 9:
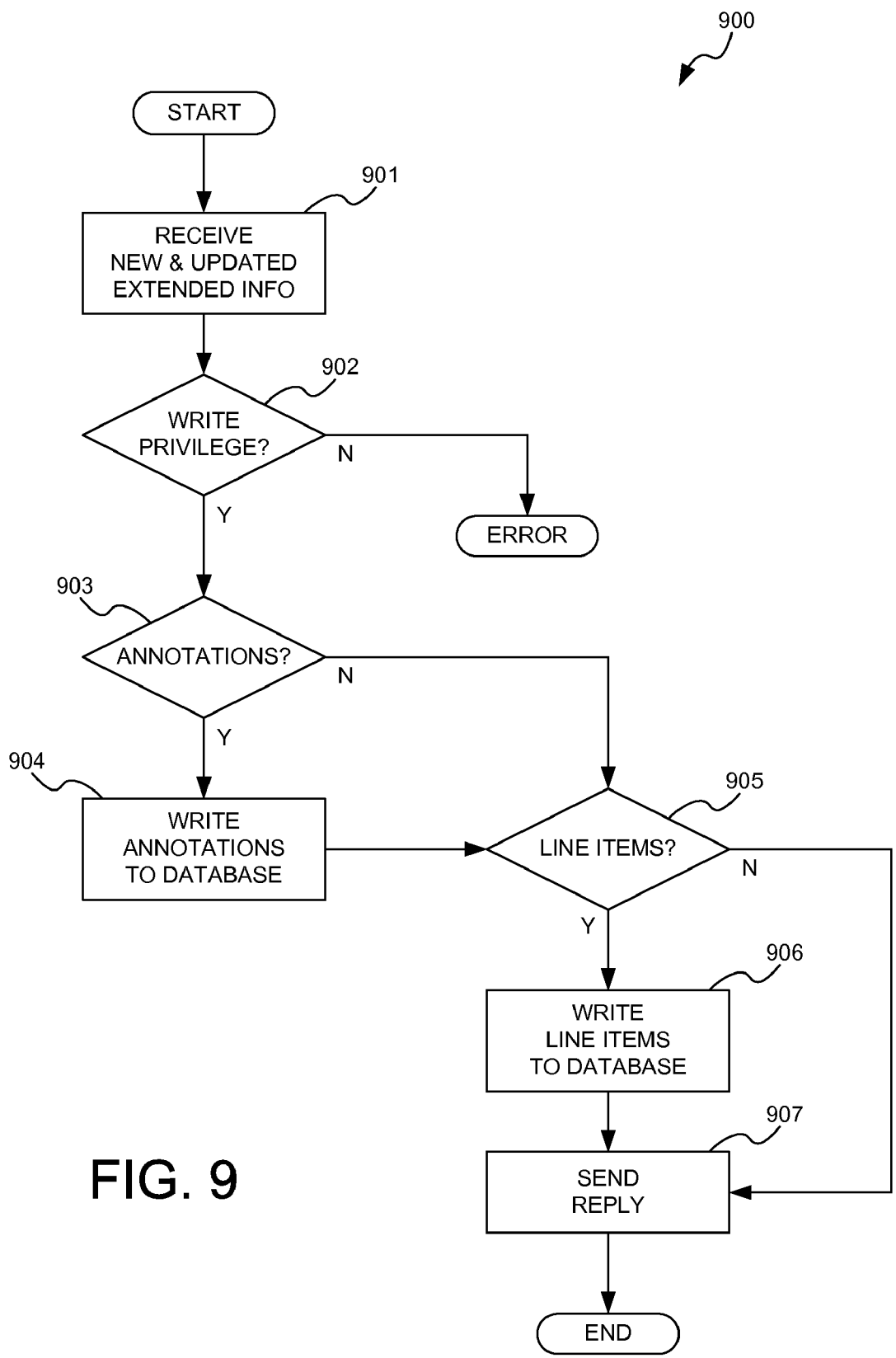
FIG. 9 is a flow diagram depicting a process for writing extended cell information according to one or more embodiments described herein.

Referring now to FIGS. 7 through 9, additional details will be provided regarding the embodiments presented herein for utilizing extended cell information with a multidimensional data model. It should be appreciated that the logical operations of FIGS. 7-9, and described elsewhere herein are implemented (1) as a sequence of computer implemented acts or program modules running on a computing system, such as the server computer system 502, and/or (2) as interconnected machine logic circuits or circuit modules within a computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in FIGS. 7-9 and described herein. These operations may also be performed in a different order than those described herein with respect to FIGS. 7-9.

FIG. 7 in particular is a flow diagram showing a routine 700 that illustrates the operation of a computer system, described below, when utilizing extended cell information with multidimensional data models. The routine 700 begins at operation 701, where a request 503 for a multidimensional dataset 701 is received by the server computer system 502. As previously stated, the client computer system 501 and server computer system 502 may be one and the same. The request 503 may include information about dimensions, requesting specific members or ranges of members, at different levels of granularity. The request 503 is parsed, and at operation 702, the multidimensional dataset 101 is processed based on the request.

Proceeding to operation 703, information indicating the counts of annotations and/or line items for particular cells is included with the multidimensional dataset 101. These counts may be tracked and retrieved after storing and updating each count as annotations and line items are added and deleted. For each cell, an annotation count and a line item count may be stored as additional measures, possibly hidden from normal access. Moreover, the additional measures may be stored in hidden measure groups within the multidimensional data model. The measures do not need to be aggregated in order to save unnecessary processing time. By storing the counts as measures, it is possible to avoid unnecessary processing. It should be noted that counts are only one way of indicating the presence of extended cell information. Other indicators may also be stored which are retrieved at operation 703, such as flags or binary values. Ultimately, the multidimensional dataset 101, including the count information is provided in reply to the initial request 503 at operation 704.

Moving to FIG. 8, depicted is a flow diagram showing a process 800 for retrieving extended cell information. At operation 801, the request 505, 605 for the extended cell information is received. The request may include a collection of one or more cell identifiers, member identifiers, or other dimension information identifying for which cells the extended cell information is sought. At decision 802, the identity of the end user or client computer system 501 is used to evaluate whether the appropriate permissions are in place to allow viewing of all the information. Any members or cells for which read access is not granted are ignored. If all cells are ignored in this fashion, then the process 800 errors out.

At decision 803, properties of the request 505, 605 are used to determine whether annotations are sought. If annotations are sought, then at operation 804, the annotations are retrieved. If the multidimensional data model is stored in a relational database, then the annotations may be stored in a separate annotations relational table. Every cell in the multidimensional dataset 101 may have one or more annotations, and even if a cell is deleted, the annotations can remain in the separate table. If the multidimensional data model is stored in other types of databases (e.g., object or OLAP databases), then other storage techniques may be utilized for storing annotations. The retrieved annotations are then added to the reply 506, 606 at operation 805.

If no annotations are requested at decision 803, or once any found annotations are added to the reply 506, 606 at operation 805, then at decision 806, properties of the request 505, 605 are used to determine whether line items are sought. If line items are sought, then at operation 807, as with operation 804, the line items for the specified cells are retrieved. Line items may be stored in a relational table similarly keyed on cells and/or measure values. Line items whose cells and/or measure values are deleted will themselves be deleted, since the line item values are used to generate the value in the associated cell. Any retrieved line items matching the cell or member identifiers are then added to the reply 506, 606 at operation 808. At this point, the reply 506, 606, including any found annotations and/or line items are forwarded to the requesting client, and tie process 800 terminates normally.

With regard to FIG. 9, depicted is a flow diagram showing a process 900 for writing extended cell information to a multidimensional data model. When the client computer system 501 allows a user to create or update extended cell information, the request 507, 607 to write the new information to the multidimensional data model is received, along with information about which member and/or cell identifiers are affected. At decision 902, these identifiers are checked against the current user to ensure that write permission is in place for each member and/or cell. Any improper identifiers are ignored, and if no cells or members are left, then the process 900 errors out.

At decision 903, the request 507, 607 is examined to determine whether any annotations are to be added. If so, then at operation 904, the new annotations are created in the appropriate annotation table, and any annotation counts or indicators are appropriately altered to signify the presence of the new annotation. The process 900 continues to decision 905, where any line items to be added are determined. If there are new line items to be added, then at operation 906, the new line items are added to the appropriate line item table, and the counts and/or indicators are updated appropriately. At operation 907, a reply may be sent back in response to the request 507, 607 informing whether the write operation was successful.

Figure 10:
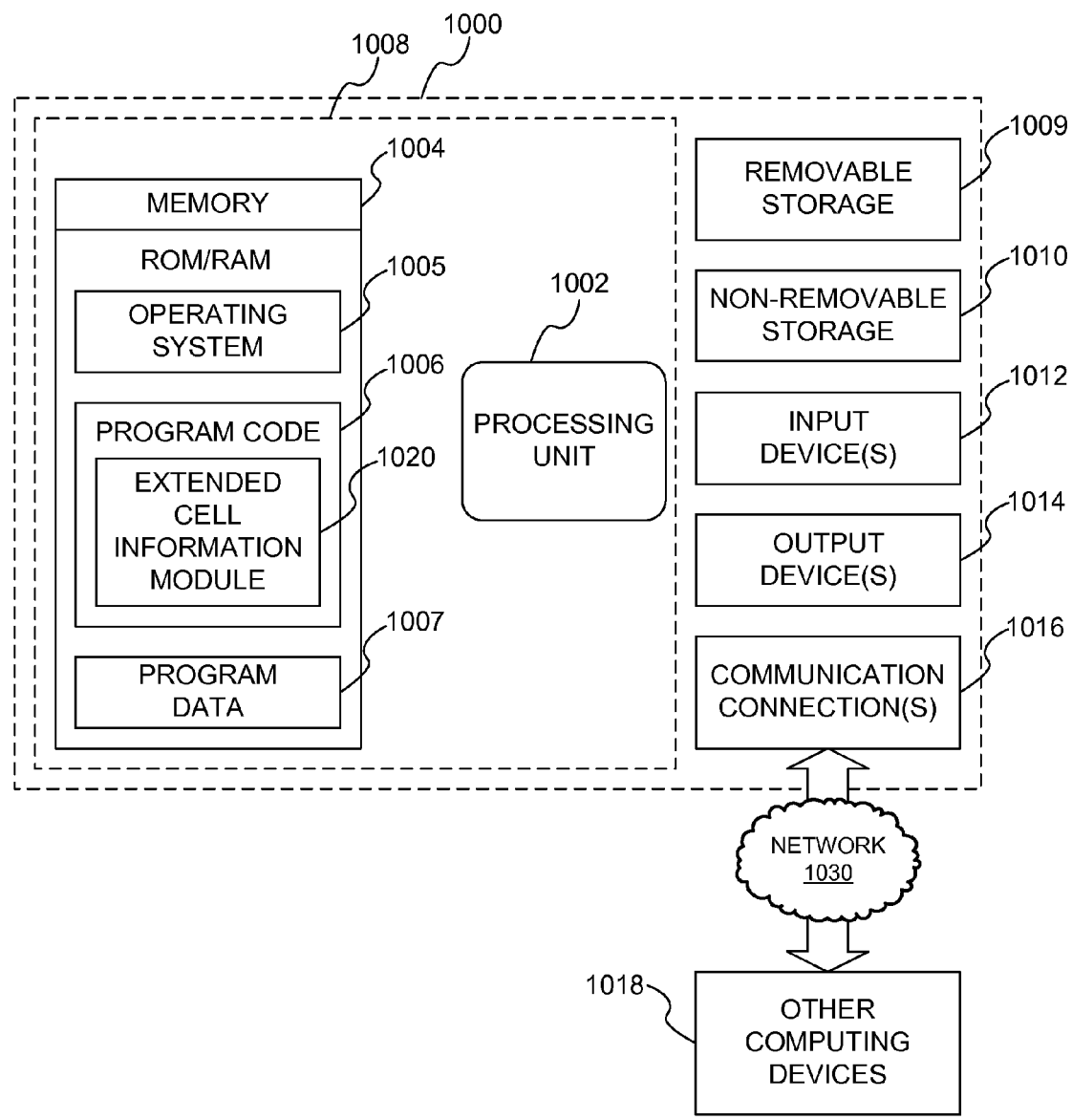
FIG. 10 is a computer architecture diagram depicting a computer architecture suitable for implementing one or more embodiments of a computer system capable of utilizing extended cell information with multidimensional data models.

With reference to FIG. 10, embodiments described herein may include a computer system 1000, such as the server computer system 502 and/or the client computer system 501. In a basic configuration 1008, the computer system 1000 includes at least one processing unit 1002 and a memory 1004. The processing unit 1002 may include one or more microprocessors, microcontrollers, co-processors, field programmable gate arrays (FPGAs), complex programmable logic devices (CPLDs), application specific integrated circuits (ASICs), and other devices capable of executing the methods and operations set forth below. Depending on the configuration of the computer system 1000, the memory 1004 may be volatile (e.g., Random Access Memory (RAM)), non-volatile (e.g., Read-Only Memory (ROM), flash memory), or some combination thereof. The memory 1004 serves as a storage location for an operating system 1005, one or more applications 1006, and may include program data 1007, as well as other modules and procedures.

In various embodiments, the applications 1006 include an extended cell information module 1020, an application including similar logic, or any other set of instructions comprising such logic. It should be noted that the logic of the extended cell information module 1020 may be distributed and/or shared across multiple devices, including the computer system 1000. More information regarding the function of the extended cell information module 1020 has been provided above.

The computer system 1000 may include additional features and functionality other than the features shown within dashed-line box 1008. For example, the computer system 1000 may include additional data storage components, including both removable storage 1009 (e.g., floppy disks, memory cards, compact discs (CDs), digital video discs (DVDs), external hard drives, universal serial bus (USB) drives and non-removable storage 1010 (e.g., magnetic hard drives).

Computer storage media may include media implemented in any method or technology for the storage of information, including computer readable instructions, data structures, program modules, or other data. The memory 1004, the removable storage 1009, and the non-removable storage 1010 are all examples of computer storage media. Further examples of computer storage media include RAM, ROM, electrically-erasable programmable ROM (EEPROM), flash memory, CD-ROM, DVD, cassettes, magnetic tape, and magnetic disks. Any such computer storage media may be accessed by components which are a part of the computer system 1000, or which are external to the computer system 1000 and connected via a communications link (e.g., Bluetooth®, USB, parallel, serial, infrared).

The computer system 1000 may also include one or more input devices 1012 for accepting user input. Examples of the input devices 1012 include a keyboard, mouse, digitizing pen, microphone, touchpad, touch-display, and combinations thereof. Similarly, the computer system 1000 may include output devices 1014 such as video displays, speakers, printers, and combinations thereof. It should be understood that the computer system 1000 may also include additional forms of storage, input, and output devices. The input devices 1012 and the output devices 1014 may include communication ports and associated hardware for communicating with external input and output devices rather than including the devices within the computer system 1000.

The computer system 1000 includes one or more communication connections 1016 that include hardware and/or software which enable the computer system 1000 to communicate with other computing devices 1018 over a network 1030. The network 1030 may include a wireless network such as, but not limited to, a Wireless Local Area Network (WLAN) such as a WiFi network, a Wireless Wide Area Network (WWAN), a Wireless Personal Area Network (WPAN) such as Bluetooth®, a Wireless Metropolitan Area Network (WMAN) such as a WiMAX network, a cellular network, and/or a satellite network. Alternatively, the network 130 may include a wired network such as, but not limited to, a cable television network, a telecommunications network, a wired Wide Area Network (WAN), a wired (Local Area Network) LAN such as the Ethernet, a wired Personal Area Network (PAN), and/or a wired Metropolitan Area Network (MAN). The network 1030 may also include any combination of the network varieties described above.

Communication media, in the form of computer readable instructions, data structures, program modules, or other data in a modulated data signal, may be shared with and by the computer system 1000 via the communication connection 1016. Modulated data signal may mean a signal that has one or more of its characteristics set or changed in such a manner as to encode information in the signal, and may include a modulated carrier wave or other transport mechanism.

Based on the foregoing, it should be appreciated that technologies for utilizing extended cell information with a multidimensional data model are disclosed. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject matter set forth in the following claims.

What is claimed is:

1. A computer-implemented method for utilizing extended cell information in conjunction with a multidimensional data model, the method comprising performing computer-implemented operations for:
   receiving a request for a multidimensional dataset;
   in response to the request for the multidimensional dataset, assembling the multidimensional dataset,
   incorporating count information into the multidimensional dataset, wherein the count information includes a count of extended cell information associated with a cell in the multidimensional dataset, and
   responding to the request for the multidimensional dataset with the multidimensional dataset;
   receiving a request for extended cell information associated with the cell;
   in response to the request for extended cell information associated with the cell, retrieving the extended cell information associated with the cell and responding to the request with the extended cell information;
   receiving a request to add extended cell information to the cell; and
   in response to receiving the request to add extended cell information to the cell, storing the extended cell information and associated the extended cell information with the cell, and wherein the extended cell information comprises a plurality of line item details associated with the cell, the plurality of line items details including a plurality of line item values that sum to a total value associated with the cell.

2. The method of claim 1, further comprising determining in response to receiving the request that a current user is permitted to receive the extended cell information for the cell.

3. The method of claim 1, further comprising determining in response to receiving the request to add extended cell information to the cell that a current user is permitted to write the extended cell information for the cell.

4. The method of claim 1, wherein the extended cell information comprises an annotation associated with the cell.

5. The method of claim 4, wherein the count information comprises a count of annotations associated with the cell.

6. The method of claim 1, wherein the count information comprises a count of the plurality of line item details associated with the cell.

7. A computing system for utilizing cell information in conjunction with a multidimensional data model, the computing system comprising:
   a computer-readable storage medium having a multidimensional data model stored thereupon, wherein the multidimensional data model is stored in a relational database; and
   a computer-readable storage medium storing an extended cell information module comprising instructions which, when executed by a processor, cause the processor to
   extract a multidimensional dataset from the multidimensional data model,
   incorporate count information into the multidimensional dataset, wherein the count information indicates a count of extended cell information associated with a cell in the multidimensional dataset is stored in a table in the relational database,
   receive a request for extended cell information for the cell, and in response to receiving the request for extended cell information, to
   retrieve the extended cell information for the cell and respond to the request with the extended cell information, and to
   receive a request to add extended cell information to the multidimensional data model to be associated with the cell, and
   in response to the request to add extended cell information to the multidimensional data model, to store the extended cell information in the table in the relational database and to associate the extended cell information with the cell, and wherein the extended cell information associated with the cell and stored in the table is a plurality of line item details associated with the cell and wherein the line item details include a plurality of line item values that sum to a total value associated with the cell.

8. The system of claim 7, wherein the extended cell information associated with the cell and stored in the table is an annotation associated with the cell.

9. The system of claim 8, wherein the count information is a count of annotations associated with the cell.

10. The system of claim 7, wherein the count information is a count of the plurality of line item details associated with the cell.

11. The system of claim 7, wherein the instructions of the extended cell information module, when executed by a processor, further cause the processor to
determine a user associated with the second request;
determine a write permission associated with the cell;
determining that the write permission applies to the user prior to storing the extended cell information.

12. A computer-readable storage medium storing computer-executable instructions which, when executed by a computer system, cause the computer system to:
process a multidimensional data model to produce a multidimensional dataset comprising a subset of data stored in the multidimensional data model including a cell;
incorporate count information into the multidimensional dataset, wherein the count information includes a count of extended cell information associated with the cell;
retrieve the extended cell information associated with the cell upon request of a client application, wherein the client application makes the request upon receiving the count information;
receive a request to add extended cell information to the multidimensional dataset to be associated with the cell, and
in response to the request to add extended cell information to the multidimensional dataset, to store the extended cell information and to associate the extended cell information with the cell, and wherein the extended cell information associated with the cell and stored in the dataset is a plurality of line item details associated with the cell and wherein the line item details include a plurality of line item values that sum to a total value associated with the cell.

13. The computer-readable medium of claim 12, wherein the count information is a count of annotations associated with the cell.

14. The computer-readable medium of claim 12, wherein the count information is a count of the plurality of line item details associated with the cell.

15. The computer-readable medium of claim 12, comprising further computer-executable instructions which, when executed by the computer system, further cause the computer system to:
determine a user associated with the client application;
determine a read permission associated with the cell; and
determine that the read permission applies to the user prior to retrieving the extended cell information associated with the cell.

* * * * *